United States Patent
Chodorow

[11] 3,774,717
[45] Nov. 27, 1973

[54] METHOD OF AND APPARATUS FOR PARTICLE DETECTION AND IDENTIFICATION

[75] Inventor: Marvin Chodorow, Menlo Park, Calif.

[73] Assignee: The Board of Trustees of Leland Stanford Junior University, Stanford, Calif.

[22] Filed: Dec. 27, 1971

[21] Appl. No.: 212,102

[52] U.S. Cl.............. 181/.5 NP, 73/61 R, 73/67.7, 340/236
[51] Int. Cl. ........................................... G01n 29/02
[58] Field of Search..................... 181/.5 NP, .5 AC; 73/61, 67.5, 67.6, 67.7, 421 A; 340/236, 261

[56] References Cited
UNITED STATES PATENTS

| | | | |
|---|---|---|---|
| 3,710,615 | 1/1973 | Johnson | 73/61 R |
| 3,133,445 | 5/1964 | Richard | 73/61 R |
| 3,523,733 | 8/1970 | Kling | 73/61 R |

*Primary Examiner*—Benjamin A. Borchelt
*Assistant Examiner*—J. V. Doramus
*Attorney*—Paul B. Fihe

[57] ABSTRACT

Method of and apparatus for detecting and identifying particles, such as biological cells, which involves placing the particle in the path of an acoustic beam of a size and at an acoustic wavelength comparable to particle size and detecting the acoustic perturbations which result.

8 Claims, 5 Drawing Figures

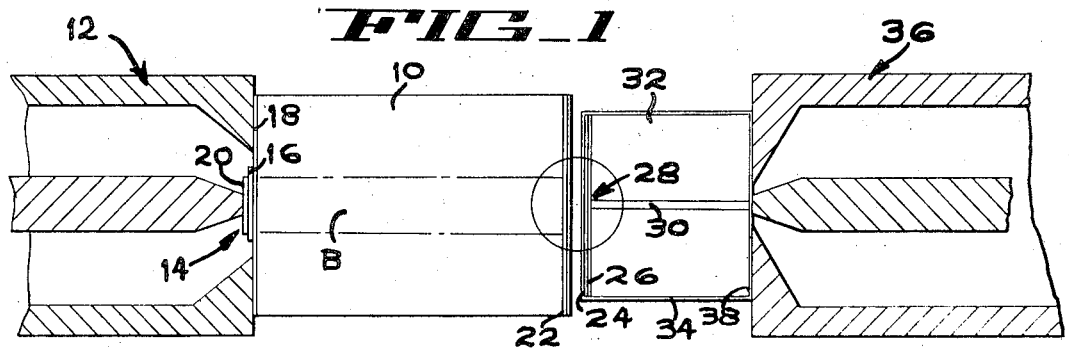
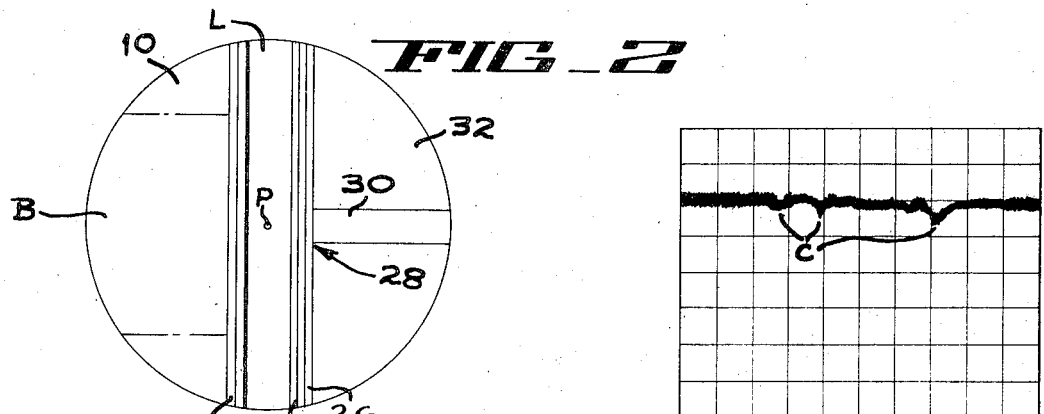
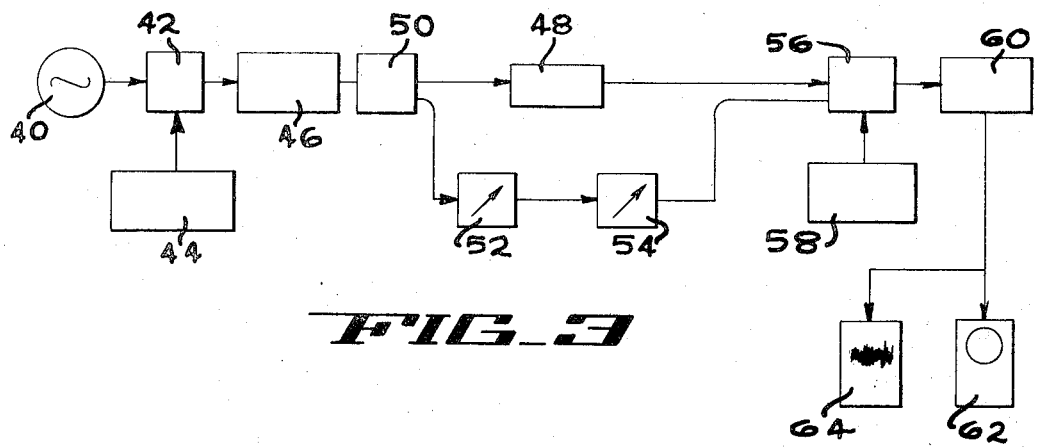
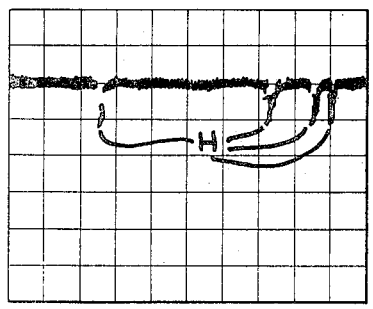

METHOD OF AND APPARATUS FOR PARTICLE DETECTION AND IDENTIFICATION

FIELD OF THE INVENTION

The present invention relates generally to particle detection and, more particularly, to a method of and apparatus for detecting and identifying particles which have individually different characteristics such as, for example, biological cells.

BACKGROUND OF THE INVENTION

The differentiation and separation of different types of biological cells is of obvious significance to the geneticist and considerable research has been performed in this area. As a result, two types of cell detectors are currently in use, one being the Coulter counter, which is now quite commonly used for clinical blood counts and enables discrimination, for example, between red blood cells and white blood cells. The basic mechanism of this detector is predicated upon the resistance properties of individual cells, it having been determined generally that the resistance change is roughly proportional to the cell size or volume.

The second type of detector operates on an optical principle, the detector being arranged to respond to the fluorescent emission stimulated by an argon laser beam, different cells having been shown to have different affinities for fluorescent stains.

While both forms of detectors are indeed useful, some limitations exist in their sensitivities, and resultant discrimination between different biological cells and inherent ambiguities in cell identification and separation have resulted.

SUMMARY OF THE PRESENT INVENTION

Accordingly, it is the general objective of the present invention to provide a novel method of and apparatus for cell or other particle detection and identification predicated generally upon the detection of the perturbations in a very short wavelength acoustic beam resultant from the presence of a particular biological cell or other particle having precisely defined characteristics. Briefly, such objective is achieved by placement of the biological cell or other particle in the path of an acoustic beam and then measuring or detecting the perturbations produced in the beam by the presence of the particular cell or particle. Such perturbations will be introduced by absorption, scattering or introduced phase shift of either transmitted or reflected acoustic energy, the sensing being generally analogous to one of the more sophisticated radar techniques wherein the character of the "target" can be determined. Alternatively, the acoustic system can be made resonant, and the presence of the cell would, in turn, effect a shift in the resonant frequency of such system corresponding to the shift of the resonant frequency of a microwave cavity resultant from the introduction of an object therewithin. The perturbations introduced by the placement of a biological cell or other particle in the beam path would be dependent not only upon the particle shape and size but also its internal structure including, for example, the internal constituents of a biological cell, the elastic properties of its membranes, and other individual characteristics thereof.

The detection and identification of cells can be enhanced by an operation at relatively high frequencies approximating 1000 megacycles, since at such high frequencies, the acoustic wavelength is comparable and actually smaller than the diameter of most biological cells, thus enabling, in a fashion somewhat analogous to discriminatory radar operations, sensitive discrimination between individual cell or particle characteristics. In addition, it is also preferred to utilize an acoustic beam whose effective cross-section is comparable to cell size thus to avoid any ambiguities in the detection of an individual cell or other particle.

Preferably, the cells or other particles are introduced into the beam path by moving the same along a transverse path which intersects the beam path, thus enabling detection and identification of each cell or particle as it moves through the beam path. Obviously, a simple blood count can be readily obtained in this fashion and excellent discrimination between different types of blood cells can be simultaneously achieved.

In accordance with a more sophisticated operation, the cells can be moved into intersecting relationship with the path of the acoustic beam across a precisely defined channel within which a fluid supporting the cells is moved in a controlled fashion, for example, by the application of a particular pressure differential along the channel where the individual particle is exposed to the acoustic beam. The motion of the individual cell in such a channel will be determined in accordance with known hydrodynamic theory not only by the motion of the supporting fluid but also by the size and shape of the cell, itself, thus providing yet additional discriminatory information for cell detection and identification.

Generally, the apparatus for carrying out the method will include some means for generating and directing a well-defined acoustic beam across the path traversed by the cells or other particles utilizing known electro-acoustic transducers for detecting the perturbations in the beam resultant from the presence of a cell or other particle. More particularly, if a transmitting transducer is also utilized for detecting the perturbations, such perturbations would be those correlated with the acoustic energy reflected by the cell or other particle, much in the fashion of the detection of the reflected "echoes" of a transmitted radar signal. Quite obviously, additional receiving transducers can be employed to detect any scattered reflections. Alternatively, a receiving transducer can be arranged in essential alignment with the transmitting transducer and the acoustic beam generated thereby so that any perturbations resultant from absorption or scattering occasioned by the presence of a particle will be detected by such receiving transducer through the resultant variation in the received acoustic energy. Rather than a single receiving transducer aligned with the transmitting transducer, a plurality of laterally-spaced receiving transducers can be arranged to precisely detect the amount of scattered acoustic energy or an array of transducers of predetermined dimensional characteristics can be arranged appropriately so as to define a resonant system, and the presence of a particle will effect a perturbation or a change of the frequency of the defined resonant system. These as well as many other arrangements of the acoustic system generally analogous to radar systems or other known electromagnetic detection systems can be visualized and the basic detection and identification mechanism is accordingly not to be limited to any particular arrangement of the apparatus so long as the presence of the biological cell or other particle in some way or other perturbs the transmitted acoustic energy. As a result, the individual cell or other particle will be detected, and because of its peculiar individual characteristic, the "signature" of the particular particle providing its precise identification will be enabled.

BRIEF DESCRIPTION OF THE DRAWING

The stated objective of the invention and the manner in which it is achieved as summarized hereinabove will be more readily understood by reference to the following detailed description of an exemplary apparatus and the manner in which it functions, as illustrated in the accompanying drawing wherein:

FIG. 1 is a central, longitudinal, sectional view of an acoustic particle detection and identification unit embodying the present invention, FIG. 2 is a greatly enlarged view of an individual cell or particle disposed in the FIG. 1 unit in detection position and indicating relative dimensions of the associated structure, FIG. 3 is a block diagram of the electronic circuitry associated with the particle detector shown in FIGS. 1 and 2, FIG. 4 is an oscillogram indicating the detection and identification of one type of biological cell, and FIG. 5 is a similar oscillogram indicating the identification of a different biological cell.

DETAILED DESCRIPTION OF THE EXEMPLARY EMBODIMENT OF THE INVENTION

With initial reference to FIG. 1, an acoustic beam, indicated at B is generated in a substantially conventional fashion in a sapphire crystal 10 through application of radio frequency energy through a coaxial transducer mount 12 to an electro-acoustic transmitting transducer 14 formed by a piezoelectric zinc oxide film 16 applied over a gold film 18 previously deposited on the highly polished end of the sapphire crystal 10. Each of the films 16, 18 are one-quarter wavelength thick for longitudinal acoustic waves, and if, for example, the radio frequency energy is supplied at a frequency of 860 MHz, the corresponding thickness of the zinc oxide film 16 and the gold film 18 will be approximately 1.8 microns and 0.95 microns. The radio frequency energy is applied through an outer electrode layer 20 of aluminum approximately 0.1 microns thick which provides excellent confinement of the applied electric fields and thus defines the cross-sectional area of the generated acoustic beam which is directed through the center of the sapphire crystal 10. As specifically utilized, the sapphire crystal 10 is 1.5 centimeters in length with a diameter of 5 millimeters and the acoustic beam itself has a diameter of 1 millimeter although the effective detected beam cross-section is much smaller as determined by the receiving transducer as will be explained in detail hereinafter.

With continued reference to FIG. 1 and additional detailed reference to FIG. 2, the particle or cell P to be detected and identified is moved into the path of the acoustic beam in a film of liquid L which may constitute water. In such case, the end of the sapphire crystal 10 is coated with quarter wavelength films of gold (0.95 microns) and a quarter wavelength film of silicon oxide (1.8 microns) which, in a known fashion, provide an acoustic impedance transformer 22 to overcome the acoustic mismatch between the sapphire and water, thus to eliminate unwanted reflections of the acoustic energy. Preferably, the water film L within which the particle P is suspended in the acoustic beam B has a thickness of 25 microns so as to readily accommodate biological cells which typically range between 5 and 20 microns in their linear dimensions and ultimately to enable the cells or other particles to be moved into the acoustic beam through simple applied motion of the water or other supporting liquid L.

The opposite edge of the film of liquid L is defined by another acoustic impedance transformer 24 provided by one quarter wavelength layers of silicon oxide and gold which overlay another piezoelectric film of zinc oxide 26 which forms a receiving electro-acoustic transducer 28 which in accordance with the present invention has an effective receiving area whose diameter is 25 microns and thus is generally comparable in dimensions to the size of the particles or cells P being detected. Preferably, as illustrated, this small receiving area is defined by the end of a thin tungston wire 30 having a diameter of 25 microns surrounded by a layer of glass 32 which is in turn encompassed by an exterior metal film 34 enabling electrical continuity with a standard coaxial mount 36 at the opposite end of the glass structure and appropriately joined thereto by a quarter wavelength film of gold 38 deposited between the glass 32 and the coaxial transducer mount 36.

Since the receiving transducer 28 has a central conductor composed of the tungston wire 30 which is only 25 microns in diameter, only perturbations of the received acoustic energy occuring within the corresponding cross-sectional area will be observed, and, as a consequence, the effective acoustic beam has a corresponding diameter of 25 microns, this being comparable dimensionally with the size of the particles which are to be detected and identified, as previously indicated.

Quite obviously, the transmitting transducer 14 could also have a central conductor of similarly small cross-section. Additionally, in accordance with known techniques, the transmitted acoustic beam B could be focused from a transmitting transducer thus to concentrate acoustic energy in the relatively small area corresponding to the described dimensions of the receiving transducer 28.

It is to be particularly observed that at the operating frequency of 860 MHz, the acoustic wavelength in the water is approximately 2 microns, a dimension comparable and actually somewhat smaller than that of typical biological cells, and in a manner corresponding to the well known high frequency radar techniques for discrimination between targets, excellent discrimination in the characteristics of absorption, scattering, etc. of the biological cells results, and the overall results of detection and identification of cells or other particles obtained with the described device has been excellent.

While the external circuitry which supplies the FIG. 1 detector with radio frequency energy and ultimately detects acoustic perturbations resultant from the presence of the biological cell or other particle P can take various forms, a phase sensitive detection scheme illustrated in block diagram form in FIG. 3 has been found to be extremely effective. A CW signal from a microwave signal generator 40 operating at the mentioned frequency of 860 MHz is pulse modulated by a modulator 42 controlled by a suitable pulse generator 44 which produces variable pulse lengths but typically approximating 3 microseconds. Thus pulse modulated signal is then amplified by a traveling wave tube amplifier 46 and the output of the amplifier is delivered both to the cell detector 48 and through a directional coupler 50 to an external variable attenuator 52 and phase shifter 54 which can be adjusted. The detector output signal and the bypassed original signal are mixed in an intermediate frequency amplifier 56 connected to suitable local oscillator 58 and after further amplification, in another standard amplifier 60, the phase-compared signals are delivered to an oscilloscope 62 and, if desired, to a time-base recorder 64.

The visually presented results of the detection system for two different types of cells appear in the oscillograms of FIGS. 4 and 5, the FIG. 4 presentation being that produced by the detection of chicken red blood cells having linear dimensions between 5 and 8 microns, and the corresponding FIG. 5 presentation being that resultant from the detection of hamster ovary cells having linear dimensions between 15 and 20 microns. As clearly can be visualized by reference to these figures, the cells can be distinguished readily, the chicken cells of FIG. 4 producing a rather broad but shallow variation in the acoustic power transmission, as indicated at C, the hamster cells producing a much greater yet shorter variation in power, as indicated at H in FIG. 5.

Depending upon the required sensitivity of the mechanism, it is apparent that other transducers of a similar nature can be disposed generally in the vicinity of transmitting or receiving transducers, illustrated in FIG. 1, to receive reflective or refracted scattered acoustic energy, which in turn will provide additional discriminatory signals resultant from individual variations in the size and shape as well as internal constituents of the biological cells or other particles in the detection region, and the same basic principle of detecting perturbations of the acoustic energy can render the detection and identification yet more precise.

If the movement of liquid to bring the particles into the detecting region is slightly modified from the film arrangement shown in FIG. 1, yet further enhancement of the particle or cell identification can be envisioned in accordance with known hydrodynamic principles. If a well defined cylindrical or other channel is arranged to pass between the transmitting and receiving transducers of FIG. 1, and a predetermined flow of the liquid through this channel is established, for example, by application of a predetermined pressure differential, the actual motion of the cells or other particles will vary depending upon the particular size and shape of those particles, such motion in a confined channel having been well defined, for example, in a text by Happel and Brenner entitled, "LOW REYNOLDS NUMBER HYDRODYNAMICS" (1965). The resultant timed indication of the cell or particle motion can be utilized as a further discriminatory feature providing yet more precise definition of the cell or particle "signature" for identification purposes.

Additional variations in the method or apparatus can be envisioned without departing from the spirit of the invention and the foregoing detailed description is accordingly not to be construed in a limiting sense and the scope of the invention is to be indicated only by the appended claims.

What is claimed is:

1. The method of particle detection and identification which comprises the steps of
   directing an acoustic beam having a wavelength comparable to or smaller than the size of the particle along a predetermined path,
   placing a particle in the beam path, and
   detecting perturbations of the acoustic beam resultant from the presence of the particle in the beam path.

2. The method of particle detection and identification according to claim 1 wherein
   the effective cross-section of the acoustic beam is comparable in size to that of the particle.

3. The method of particle detection and identification according to claim 1 which comprises
   supporting particles in a fluid, and
   moving the fluid along a predetermined path intersecting the acoustic beam path thus to bring particles into the detecting region.

4. The method of particle detection and identification according to claim 3 wherein
   the fluid path in the acoustic beam detection region is small, being but slightly larger than the size of particles to be detected.

5. The method of particle detection and identification according to claim 4 wherein
   the fluid path is a channel having a precisely-defined cross-section.

6. Particle detection and identification apparatus which comprises
   means for generating and directing an acoustic beam having a wavelength comparable to or smaller than the size of the particle along a predetermined path,
   means for supporting a particle in said beam path, and
   means for detecting perturbations of the acoustic beam resultant from the presence of a particle in the beam path.

7. Particle detection and identification apparatus according to claim 6 wherein
   said particle supporting means includes a fluid channel intersecting the acoustic beams and which comprises
   means for moving fluid through said channel at a predetermined rate.

8. Particle detection and identification apparatus according to claim 6 wherein
   said perturbation detecting means includes an electro-acoustic receiving transducer having an effective sensing area comparable in size to the particles.

* * * * *